United States Patent
Birk et al.

(10) Patent No.: US 8,023,821 B1
(45) Date of Patent: Sep. 20, 2011

(54) LOW COST NETWORK ARCHITECTURE USING THIN OPTICAL TRANSPORT LAYER

(75) Inventors: Martin Birk, Belford, NJ (US);
Kathleen A. Tse, Holmdel, NJ (US);
Simon Zelingher, Morganville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 615 days.

(21) Appl. No.: 11/823,944

(22) Filed: Jun. 29, 2007

(51) Int. Cl.
*H04J 14/00* (2006.01)

(52) U.S. Cl. .......... 398/67; 398/46; 398/48; 398/57; 398/74

(58) Field of Classification Search ........... 398/45–51, 398/57, 74, 67, 72, 175–177
See application file for complete search history.

(56) References Cited

U.S. PATENT DOCUMENTS

| | | | |
|---|---|---|---|
| 2001/0046348 A1* | 11/2001 | Sarkimukka et al. | 385/24 |
| 2003/0026515 A1* | 2/2003 | Barenburg et al. | 385/14 |
| 2003/0030866 A1* | 2/2003 | Yoo | 359/128 |
| 2004/0234194 A1* | 11/2004 | Persson | 385/24 |
| 2008/0095541 A1* | 4/2008 | Dallesasse | 398/191 |

* cited by examiner

*Primary Examiner* — Dalzid Singh

(57) ABSTRACT

This is a method for use in architecting low cost networks using a thin optical transport layer. A long reach hot pluggable interface is inserted onto an electrical switch resulting in a standardization of the optical layer. Standardized parts like the long reach hot pluggable interfaces and standard control planes form the logic that connects components of the low cost optical layer. After the components are in place, provisioning is done at end points only. This ensures an automatic and fast turn-up capacity without the need to visit intermediate sites in the network.

22 Claims, 4 Drawing Sheets

LOW COST NETWORK ARCHITECTURE USING THIN OPTICAL TRANSPORT LAYER

FIELD OF THE INVENTION

The present invention relates generally to network architectures for service provider networks. More specifically, the present invention relates to a low cost network architecture using a thin optical transport layer.

BACKGROUND OF THE INVENTION

With an increase in usage and deployment of optical networks, network reliability, scaling, and costs have become serious problems in providing communication services. Currently, to add capacity to a network, providers must go through a painstaking and time-consuming effort to build out the network offline. That process is further complicated because there is no convenient time for an optical network to be out of service. Original deployment can also be a problem as equipment providers often limit solution offerings to entire networks comprising proprietary components and do not provide for inter-working with other vendors' products. Proprietary components act as a further limiting factor for network growth.

Photonic layers of today's optical networks often are vendor dependent and have proprietary interfaces. Each vendor independently optimizes each individual component and sells full proprietary solutions, often without leveraging standardized platforms. However, advances in technology have reduced transmission limitations, increased the number of wavelengths that can be sent down a fiber, improved amplification techniques, performance, protection and redundancy of the network.

Until recently, transport was provided at the core of the network and provided only point-to-point transport services. A strong shift in revenue opportunities, changing traffic patterns from the enterprise customer, and capabilities to drive optical fiber into metropolitan (metro) areas has opened up additional applications of optical networking.

As is known in the art, a traditional service provider network includes a plurality of processing sites generally referred to as nodes connected by one or more physical and/or logical connections. When the connections establish transmission of a signal between the nodes, the connections are generally referred to as links. Each node typically performs a switching function and one or more additional functions. The nodes may be coupled together in a variety of different network structures.

FIG. 1 shows a state of the art optical network architecture. The architecture includes reconfigurable optical add-drop multiplexers (ROADMs) (104, 110, 122, 124, 112). Operators can send soft commands to the ROADMs to remotely reconfigure them. The ROADMs can drop or add wavelengths without interrupting the 'pass-through' channels. The ROADMs are located in major cities for adding and dropping traffic. In between cities, the ROADMs are linked by optical transport networks of optical fibers (128, 120) and amplifiers (106, 126).

The transmission of a signal from a first or source node to a second or destination node may involve the transmission of the signal through a plurality of intermediate links and nodes coupled between the source node and the destination node. FIG. 1 shows such a plurality of links (128, 120) and nodes (100, 108, 114, 130, 118). The succession of links and nodes between a source node 100 and a destination node 114 is referred to as a path (128, 120). This example path starts at the transponder 102 (described in detail below) to ROADM 104 and continues through the link 128 and then through the ROADM 110, through the link 120 and to the transponder 116 to the destination switch 114.

FIG. 2 shows more detail on how a client, such as the switches (200, 224), is connected to a state of the art network. Short reach hot pluggable interfaces (202, 206, 218, and 222) are frequently used in connecting clients because they can be inserted or removed from a live network without disturbing other in-service channels. These interfaces facilitate keeping and installing ready-to-use spares, which in turn reduces the amount of redundancy needed for related components. Another advantage of hot pluggable interfaces is lower cost, as they are a standard for multiple vendors and are flexible since they work with a variety of equipment and vendors' products.

Transponders (208, 216) are automatic devices that receive, regenerate, and retransmit a signal on a different wavelength. For example, a transponder can translate a short reach client signal into a long reach line signal. The transponder, while extremely necessary in optical networks, is a high cost component and many of them are needed relative to the quantities of other equipment in the network. Current architecture somewhat reduces the number of transponders needed by allowing optical expressing and selective regeneration to clean up noise at ROADM nodes. Because the transponders are so prevalent in the network and they are so expensive, there is a need to further reduce the number of transponders.

Short reach hot pluggable interfaces (202, 206, 218, 222) are used on the switches (200, 224) and the WDM transponder (208, 216) with "grey" optics (204, 220) in between. The connection 204, 220 between pairs of short reach hot pluggable interfaces is a low grade optical connection. This connection includes grey optics, a low cost laser lacking good wavelength control and stabilization. From the WDM transponder 208, the signal is multiplexed by the optical MULTIPLEXER 210 and transmitted through the optical line 214, including amplifiers and ROADMs (not shown in detail here). The signal is demultiplexed by the optical DEMULTIPLEXER 212 on the other side of the network and then again translated by a WDM transponder 216 and sent through grey optics 220 and the short reach hot pluggable interface 222 to the switch 224.

The optical network shown in FIG. 1 and FIG. 2 may be a Synchronous Optical Network (SONET). SONET is both a standard and a set of specifications for building high speed, digital communications networks that run over fiber-optic cables while interfacing with existing electrical protocols and asynchronous transmission equipment. The use of fiber-optics in such networks provides a dramatic increase in available bandwidth. Bandwidth is currently estimated in the hundreds of gigabits per second. One of the principal benefits of SONET is that it allows for the direct multiplexing of current network services, such as DS1, DS1C, DS2, and DS3, into the synchronous payload of Synchronous Transport Signals (STS). The STS provide an electrical interface that is used as a multiplexing mechanism within SONET Network Elements (NE). In the SONET multiplexing format, the basic signal transmission rate, i.e., STS-1, operates at 51.84 million bits per second. STS-1 can carry 28 DS1 signals or one asynchronous DS3. STS-1 signals are then multiplexed to produce higher bit rates STS-2, STS-3, etc. This is referred to as grooming. SONET signal levels are also defined in terms of an optical carrier (OC). Since the bit rates are the same in each case, the bit rate of STS-1 equals the bit rate of OC-1 with the only difference relating to the type of signal that is being referenced.

In a DWDM network, intermediate optical amplification sites may allow for the dropping and adding of certain wavelength channels. In most recent networks, this is done infrequently, because adding or dropping wavelengths requires manually inserting or replacing wavelength-selective cards. This is costly, and in some networks requires that all active traffic be removed from the DWDM network, because inserting or removing the wavelength-specific cards interrupts the multi-wavelength optical signal.

Flexibility is an important feature in network architecture. Networks today must support a variety of traffic types, including legacy traffic based on regional SONET ring structures that require multiple traffic adds/drops (that is, voice, asynchronous transfer mode [ATM], frame relay). At the same time, those networks must support high-speed Internet backbones which typically act as express lanes requiring little add/drop multiplexing. Networks today combine long haul and short haul traffic for better network flexibility.

A reduction in the cost of bandwidth is an important goal for a successful network. In conventional long-haul technology, the transmission signals must be regenerated every 500 km or so to overcome signal distortion due to dispersion and nonlinear effects and to overcome the build-up of noise generated within the amplifiers. This regeneration is often accomplished through optical-to-electrical-to-optical (O-E-O) conversion, the signal being regenerated during the electrical phase. Regeneration equipment is required on a per-channel basis and is, therefore, very expensive, and it also requires a large equipment footprint and high electrical power consumption and subsequent site climate control. Any reduction in regeneration equipment would result in a significant cost saving.

Control functions and interconnection mechanisms are important attributes of any network. Those attributes permit provisioning, routing, and control across disparate types of underlying transport technologies, such as IP, ATM, SONET/SDH, and DWDM. Control and interconnection are complicated because each transport technology has its own control protocols, and therefore cannot communicate directly. Often provisioning in today's hybrid networks must be done manually by a technician having knowledge of each technology domain.

Reducing complexity by providing a single access method to provision across the entire optical transport network would be highly desirable. Provisioning across multiple-vendor domains within the transport network would save in operations costs and capital costs. The word "thin" is used to denote architectures or architectural components having little complexity and low costs.

One strategy for alleviating the multi-vendor problem is providing a standard or general control plane. Generalized Multiprotocol Label Switching (GMPLS) is an example of that strategy which uses general addressing between legacy and new networks and even heterogeneous networks. GMPLS is an example of a control plane that represents a standard protocol for optical transport network elements. Such a standard protocol could be used to support functions responsible for path setup/teardown, link management and resource accounting. Standards-based protocols allow network providers a substantial cost savings by enabling them to introduce any vendor equipment into any given domain.

As IP-based services expand and traffic increases, there is a need for more cost effective network architectures. The cost associated with building and operating multiple overlay networks has become an impeding factor for traditional service providers to stay competitive. There therefore remains a need for a cost-effective technique to improve operations and provisioning cycles, provide for scalability and limit infrastructure expense, while minimizing the above-described disadvantages.

SUMMARY OF THE INVENTION

The present invention simplifies the optical layer by replacing proprietary interfaces with standard interfaces. The architecture reduces the number of transponders between a router and the WDM network in the optical path. The cost of the network architecture is reduced by using fewer components, by not paying a higher price for proprietary components, and by using standard components and therefore standard interfaces. Besides cost savings, other benefits include the capability of growing the network while it is in use at sub-wavelength capacity increments. Adding capacity is done on a forecast basis, which means that capacity can be turned up by touching the end points only. After the components are in place, provisioning is done at end points only. This ensures automatic and fast turn-up capacity without the need to visit intermediate sites in the network.

The present invention addresses the needs described above by providing a method and system for reducing active components out of the optical path and standardizing the optical layer yielding a low cost optical transport layer with rapid bandwidth provisioning. One embodiment is an optical transport network. The optical network includes a first node including a first electrical switch; a plurality of first long-reach hot-pluggable optical interfaces for converting between electrical signals from the electrical switch and wavelength band signals, each of the first long-reach hot-pluggable optical interfaces being connected to the first electrical switch for receiving the electrical signals from the switch; a WDM multiplexer directly connected to the plurality of first long-reach hot-pluggable optical interfaces for receiving the wavelength band signals from the interfaces and combining the wavelength band signals to form a multiplexed DWDM signal; a WDM demultiplexer for receiving the multiplexed DWDM signal and separating it into a plurality of wavelength band signals; a plurality of second long-reach hot-pluggable optical interfaces directly connected to the WDM demultiplexer for receiving the wavelength band signals, the second plurality of long-reach hot-pluggable optical interfaces converting between the wavelength band signals and the electrical signals; a second node including a second electrical switch, the second electrical switch being connected to the plurality of second long-reach hot-pluggable optical interfaces for receiving the electrical signals from the interfaces.

The first and second electrical switches in the optical transport network may be SONET switches. The first and second electrical switches in the optical transport network may be Internet Protocol (IP) routers. The first and second electrical switches in the optical transport network may be Optical Transport Network (OTN) switches.

At least one of the first and second long-reach hot-pluggable optical interfaces in the optical transport network may be a long-reach XFP interface. At least one of the first and second long-reach hot-pluggable optical interfaces in the optical transport network may be a tunable interface. At least one of the first and second long-reach hot-pluggable optical interfaces in the optical transport network may be a fixed WDM grid interface.

The optical transport network may further comprise at least one optical amplifier arranged for amplifying the multiplexed DWDM signal.

The optical transport network may further comprise a control plane for automating wavelengths, and service provisioning. The optical transport network may further comprise manually controlled wavelength and service provisioning. At least one of the multiplexer and demultiplexer may provide tunable wavelengths.

Another embodiment of the invention is a method for transporting data from a first electrical switch into an optical transport layer. The method comprises the steps of converting an electrical signal to an optical wavelength band signal at each of a plurality of first long reach hot pluggable interfaces coupled to a first electrical switch; multiplexing the optical wavelength band signal from the long reach hot pluggable interfaces; receiving and demultiplexing the multiplexed optical signal to form a plurality of wavelength band signals; converting the optical wavelength signals to electrical signals at a plurality of second long reach hot pluggable interfaces coupled to a second electrical switch.

The first and second electrical switches in that method may be SONET switches. The first and second electrical switches in that method may be Internet Protocol (IP) routers. The first and second electrical switches in that method may be Optical Transport Network (OTN) switches.

At least one of the first and second long-reach hot-pluggable optical interfaces in that method may be a long-reach XFP interface. The method may further comprise the step of tuning wavelengths at one of the first and second long-reach hot-pluggable optical interfaces. At least one of the first and second long-reach hot-pluggable optical interfaces in that method may be a fixed WDM grid interface.

That method may further comprise step of amplifying the multiplexed DWDM signal using an optical amplifier.

That method may further comprise a control plane for automating wavelengths, and service provisioning. That method may further comprise a manually controlled wavelength and service provisioning.

That method may further comprise the step of tuning the wavelengths in the multiplexed optical signal.

DESCRIPTION OF THE INVENTION

Figure 1:
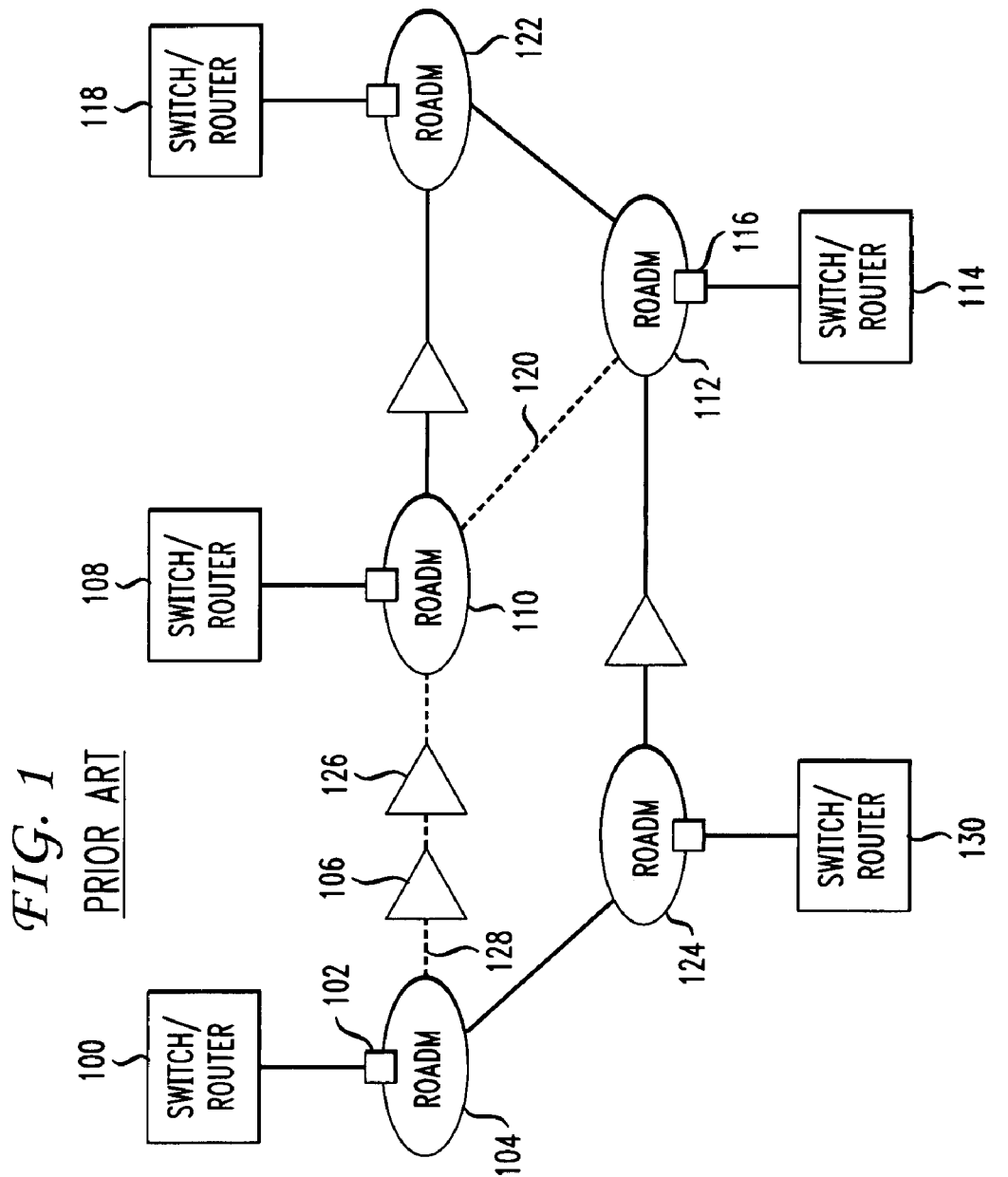
FIG. 1 is an overview schematic representation of a prior art optical network architecture in a ring topology.
Figure 2:
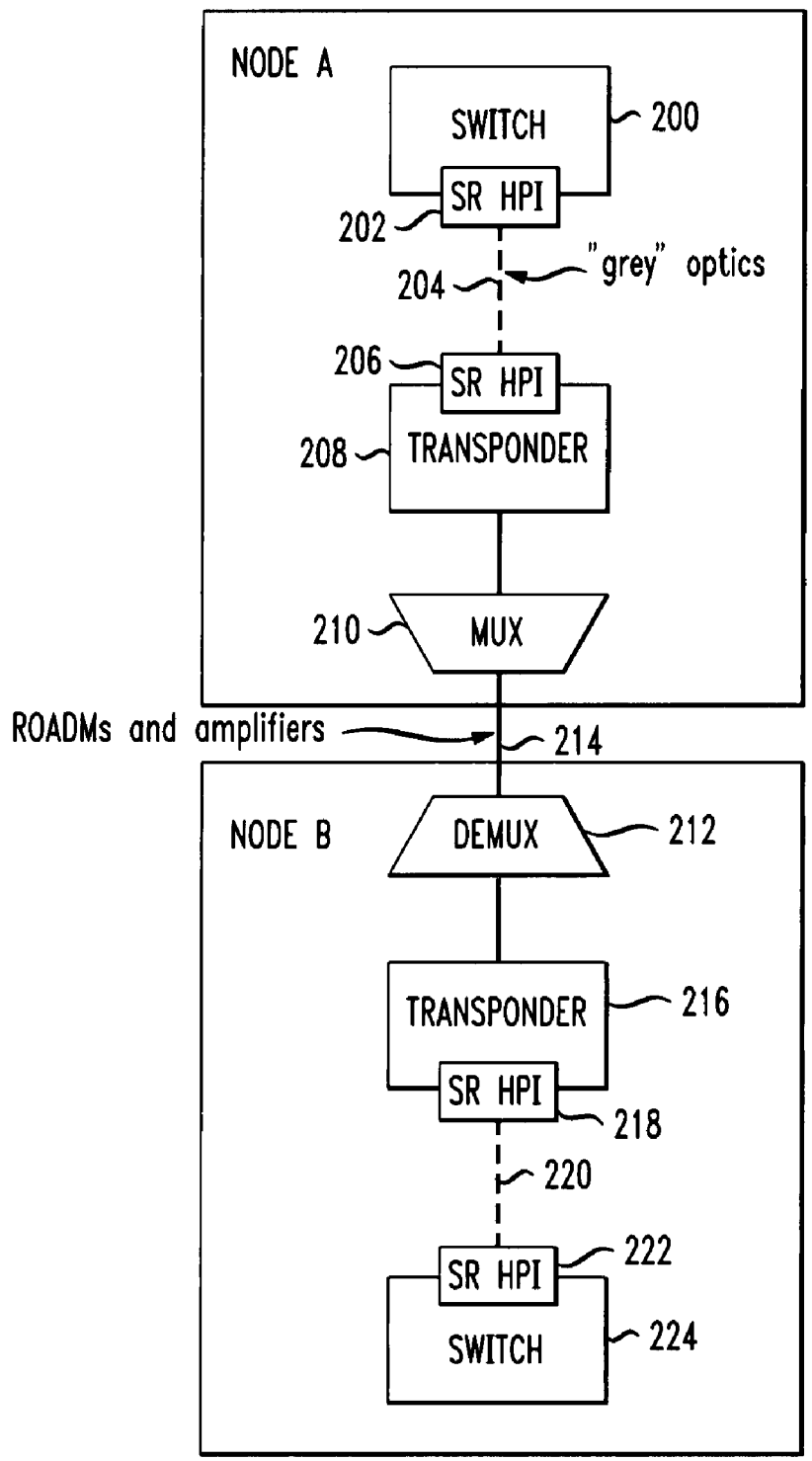
FIG. 2 is a schematic representation of a prior art point to point optical network architecture.
Figure 3:
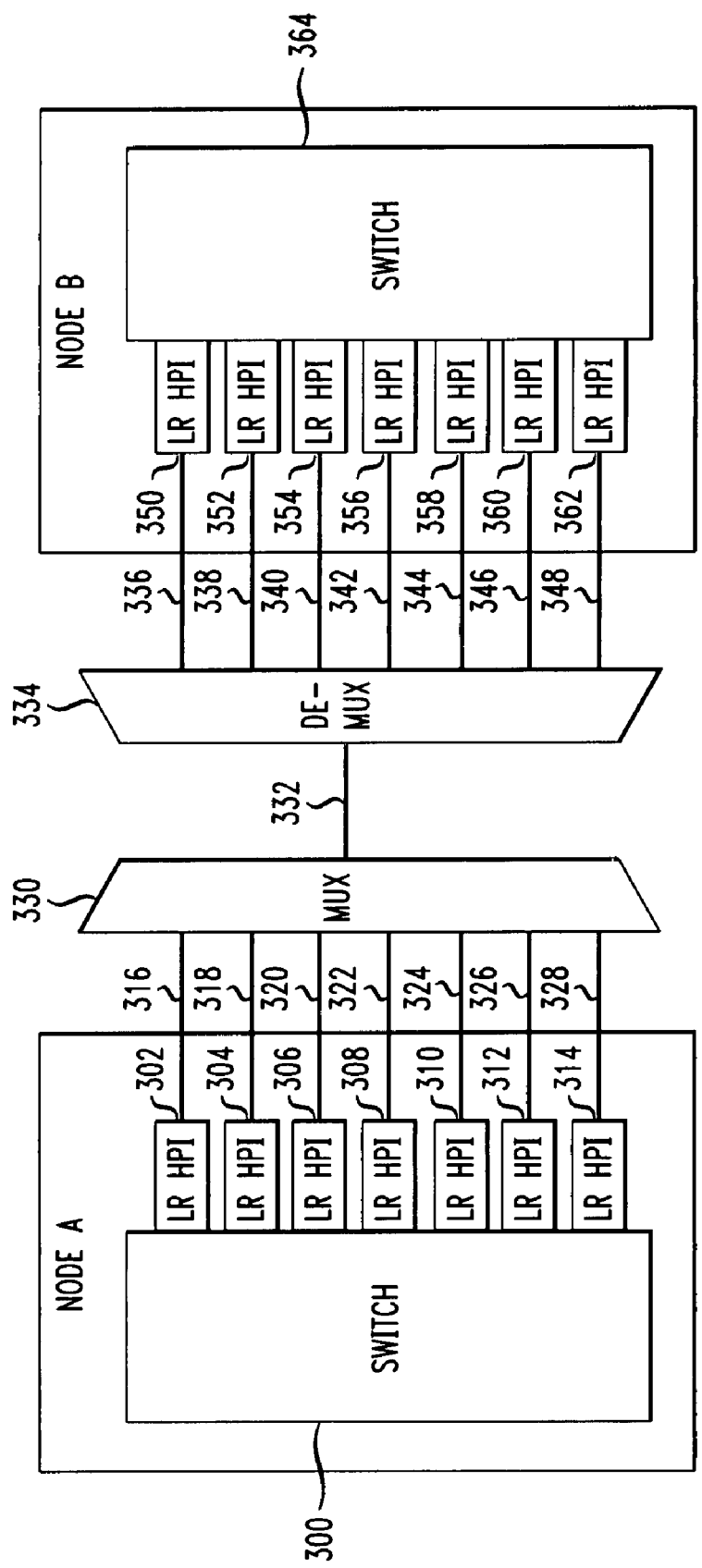
FIG. 3 is a detailed view of a network architecture utilizing long reach hot pluggable interfaces in an optical network according to one embodiment of the invention.

The inventors have developed a method and a system for simplification of the optical layer. A point to point optical network 301 according to one embodiment of the invention is shown in FIG. 3. Electrical switches/routers 300, 364 are nodes in the network 301. The switches may be SONET switches in the case of a SONET network, IP routers in an IP network or OTN switches for wrapped general traffic.

Facing the network the electrical switch 300 has a plurality of Long Reach Hot Pluggable Interfaces (LRHPI) 302, 304, 306, 308, 310, 312, 314 that are either tunable or on a fixed WDM grid. These long reach interfaces each generate a particular wavelength on a link 316, 318, 320, 322, 324, 326, 328 which plugs directly into an optical multiplexer 330. The optical multiplexer sends the multiplexed signal out across a multiplexed link 332 and into an optical demultiplexer 334 at the other end of the link.

The architecture of the photonic transport layer is very simple according to the present invention. It consists of the optical multiplexer 330 and the optical demultiplexer 334, low cost optical amplifiers on long distances between an optical multiplexer and an optical demultiplexer, and optional dispersion compensation placed at the maximum dispersion span to accommodate for the degradation of optical signals over distance, to compensate when the network reach is longer than the reach of the interfaces. The optical demultiplexer, demultiplexes the signal and sends the results along the links 336, 338, 340, 342, 344, 346, 348 to the receiving LRHPI 350, 352, 354, 356, 358, 360, 362 and into the electrical switch 364. This architecture uses simple and low cost components for the optical transport and uses electrical switches similar to those in use today for the end points.

The advantage of this architecture is that newly added capacity is entirely within the endpoints and without any immediate site-visits to be done in the core of the network. Capacity may be added off-line quickly during site visits due to the use of standard components and due to easy access of the network edge. Adding capacity does not affect service since provisioning is done in real time.

Figure 4:
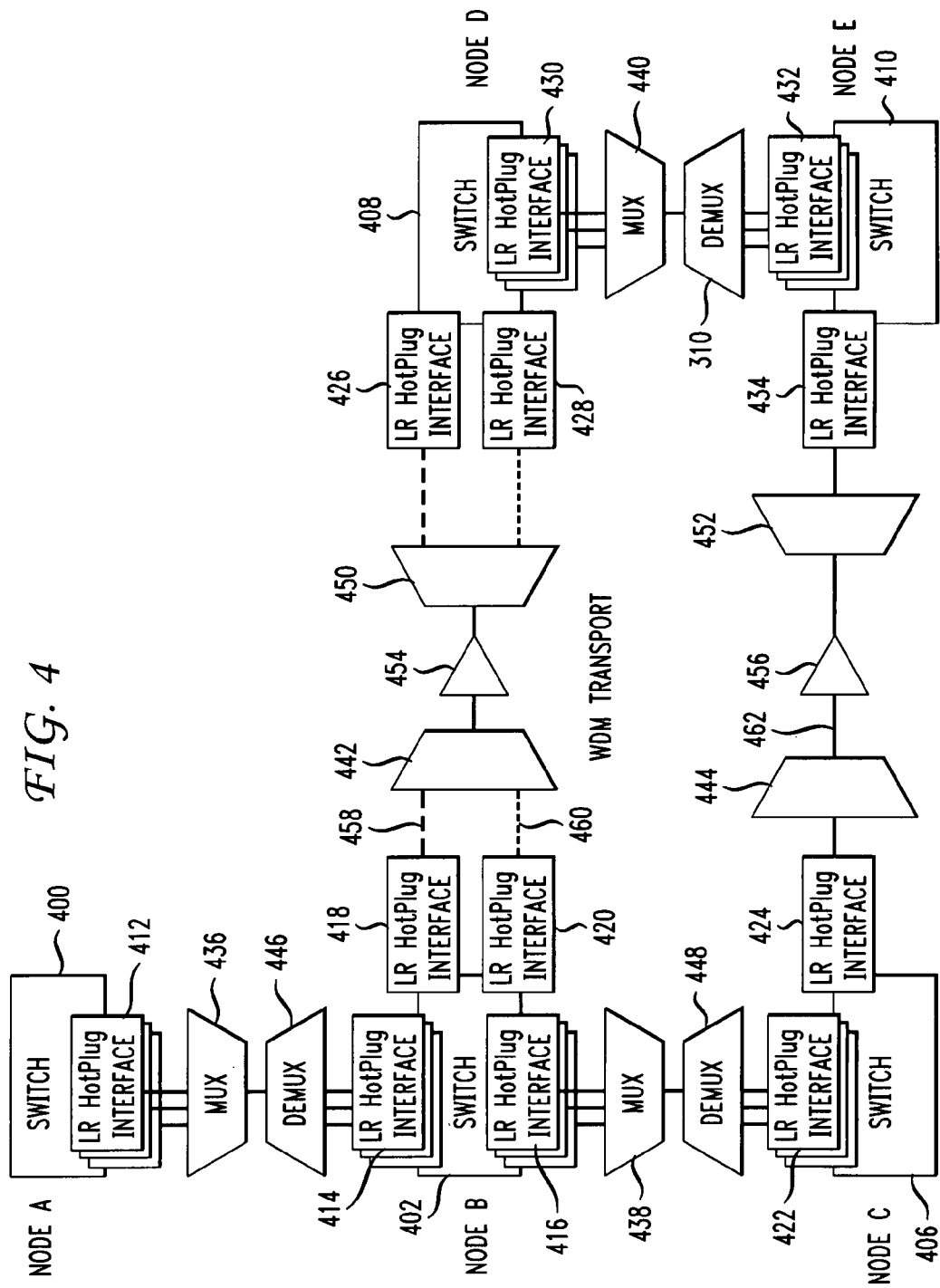
FIG. 4 is a depiction of an optical network architecture according to one embodiment of the invention.

A more detailed view of the inventive network architecture is presented in FIG. 4. The electrical switches (400, 402, 406, 408, and 410) directly house the long reach hot pluggable interfaces (LRHPI) (412, 414, 416, 418, 420, 422, 424, 426, 428, 430, 432, and 434). The LRHPI receive the client signal from the switch and then convert and transmit the signal into the multiple wavelengths of the WDM grid.

The hot pluggable interfaces support high grade colored optics. Because the colored long reach optics used in the present invention are highly integrated and standardized, they are more flexible. The precision optics allow more wave lengths to travel through the network and may be tunable. Even though the long reach optics cost more than the short reach optics used in the prior art, they are still considerably cheaper than the transponder short reach interface which they replace.

The electrical switch/router 400 performs the switching, plus adds new transmission functionality of grooming and protection/restoration. In the architecture of the present invention, the switch performs functions which were previously performed by the ROADMs of the prior art. It is the long reach hot pluggable interface that allows the integration of transmission and switching functions.

From the long reach pluggable interface 412, the signal is multiplexed by the optical multiplexer 436 and transmitted through the optical line which is a long reach fiber which may contain amplifiers. The optical line then terminates at the optical demultiplexer 446. The signal is demultiplexed by the optical demultiplexer and then again translated by the long reach hot pluggable interfaces 414 of the receiving switch 402.

For a path from Node A starting at switch 400 to Node E and ending at switch 410, the route might include transit through Node B 402, Node C 406, to Node E 410 or Node B 402, Node D 408 to Node E 410. A standard LRHPI component as a hot-swappable, protocol-independent optical transceiver, works in many applications such as SONET/SDH, OTN, Fibre Channel, Gigabit Ethernet and other applications, including DWDM links. The standard LRHPI includes extensive digital diagnostics; providing a robust management tool in network configuration. Using standard components, for example XFP as an LRHPI, contains costs and opens the architecture to multiple vendor products in building these simple optical transport networks.

The system and method of the invention provide a new architecture to provision optical networks quickly, accurately and in a cost-efficient way, enabling transport service providers to provide high quality service. Given the rapid increase in the use and demand of optical network bandwidth, this method has great potential in future networks.

The method furthermore reduces the need for operational service provider support as standard components require less administration and the network can be managed without affecting service. The method also requires no special knowledge of the transport providers; for example, providers do not need to understand the various protocols of the network layers or the optical network platform. The method greatly reduces the time required to provision and build out a new or existing optical network.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to an optical networking system supporting electrical connection to SONET switches, the method and apparatus of the invention may be instead embodied by a stand-alone system that is connected to another protocol switch, for example IP, Ethernet, OTN. It is further noted that the invention is not limited to use with SONET, as described in this specification, but can be used with any communication protocol or optical networking technology existing today or developed in the future. It is to be understood that the embodiments shown and described herein are only illustrative of the principles of the present invention and that various modifications may be implemented by those skilled in the art without departing from the scope and spirit of the invention.

What is claimed is:

1. An optical transport network, comprising:
   a first network endpoint comprising a first network router for routing traffic through at least one intermediate network node to a destination network node, the first network router comprising a plurality of first hot-pluggable interfaces;
   a plurality of first long-reach hot-pluggable optical transceivers physically plugged into the plurality of first hot-pluggable interfaces of the first network router for converting between first electrical signals from the first network router and wavelength band signals;
   the first network router being configured for selecting a subset of the first long-reach hot-pluggable optical transceivers for converting a subset of the first electrical signals to a plurality of first wavelength band signals, the selecting being based on a route to be taken by the plurality of first wavelength band signals through the network;
   a WDM multiplexer directly connected to the subset of the first long-reach hot-pluggable optical transceivers for receiving the plurality of first wavelength band signals from the first long-reach hot-pluggable optical transceivers and combining the first wavelength band signals to form a multiplexed DWDM signal;
   a WDM demultiplexer for receiving the multiplexed DWDM signal and separating the multiplexed DWDM signal into a plurality of second wavelength band signals;
   a network node comprising a second network router, the second network router comprising a plurality of second hot-pluggable interfaces;
   a plurality of second long-reach hot-pluggable optical transceivers physically plugged into the plurality of second hot-pluggable interfaces of the second network router, the plurality of second long-reach hot-pluggable optical transceivers being directly connected to the WDM demultiplexer for converting between the plurality of second wavelength band signals and second electrical signals;
   the first network router further being configured to provision additional wavelength band signals of the multiplexed DWDM signal, without inserting and without activating wavelength selective devices at points between the plurality of first long-reach hot-pluggable optical transceivers and the plurality of second long-reach hot-pluggable optical transceivers.

2. The optical transport network of claim 1, wherein the first and second network routers comprise SONET switches.

3. The optical transport network of claim 1, wherein the first and second network routers comprise Internet Protocol routers.

4. The optical transport network of claim 1, wherein the first and second network routers comprise Optical Transport Network switches.

5. The optical transport network of claim 1, wherein at least one of the first and second long-reach hot pluggable optical transceivers comprises a long-reach XFP transceiver.

6. The optical transport network of claim 1, wherein at least one of the first and second long-reach hot-pluggable optical interfaces is a tunable interface.

7. The optical transport network of claim 1, wherein at least one of the first and second long-reach hot-pluggable optical interfaces is a fixed WDM grid interface.

8. The optical transport network of claim 1, further comprising:
   at least one optical amplifier arranged for amplifying the multiplexed DWDM signal.

9. The optical transport network of claim 1, further comprising:
   a control plane for automating wavelengths, and service provisioning.

10. The optical transport network of claim 1, further comprising:
    manually controlled wavelength and service provisioning.

11. The optical transport network of claim 1, wherein at least one of the multiplexer and demultiplexer provides tunable wavelengths.

12. A method for transporting data from a network endpoint comprising a first network router for routing traffic through at least one intermediate node to a destination node, using an optical transport layer comprising:
    at the first network router, selecting a subset of a plurality of first long-reach hot-pluggable optical transceivers physically plugged into a plurality of first hot-pluggable optical interfaces of the first network router for converting first electrical signals to a plurality of first wavelength band signals, the selecting being based on a route to be taken by the plurality of first wavelength band signals through the network;
    converting the first electrical signals to the plurality of first wavelength band signals at the subset of first long reach hot pluggable optical transceivers;
    multiplexing the plurality of first wavelength band signals from long reach hot pluggable transceivers to form a multiplexed optical signal;
    receiving and demultiplexing the multiplexed optical signal to form a plurality of second wavelength band signals;

converting the plurality of second optical wavelength band signals to second electrical signals at a plurality of second long-reach hot-pluggable optical transceivers physically plugged into a plurality of second hot pluggable interfaces of a second network router;

provisioning additional wavelength band signals to increase a capacity for the traffic through the at least one intermediate network node to the destination node without inserting and without activating wavelength selective devices at points between the plurality of first long-reach hot-pluggable optical transceivers and the plurality of second long-reach hot-pluggable optical transceivers.

13. The method of claim 12, wherein the first and second network routers comprise SONET switches.

14. The method of claim 12, wherein the first and second network routers comprise Internet Protocol routers.

15. The method of claim 12, wherein the first and second network routers comprise Optical Transport Network switches.

16. The method of claim 12, wherein at least one of the first and second long-reach hot pluggable optical transceivers comprises a long-reach XFP transceiver.

17. The method of claim 12, further comprising tuning wavelengths at one of the first and second long-reach hot-pluggable optical.

18. The method of claim 12, wherein at least one of the first and second long-reach hot-pluggable optical interfaces is a fixed WDM grid interface.

19. The method of claim 12, further comprising amplifying the multiplexed optical signal using an optical amplifier.

20. The method of claim 12, further comprising:
a control plane for automating wavelengths, and service provisioning.

21. The method of claim 12, further comprising manually controlling wavelength and service provisioning.

22. The method of claim 12, further comprising tuning wavelengths in the multiplexed optical signal.

* * * * *